Patented Nov. 2, 1943

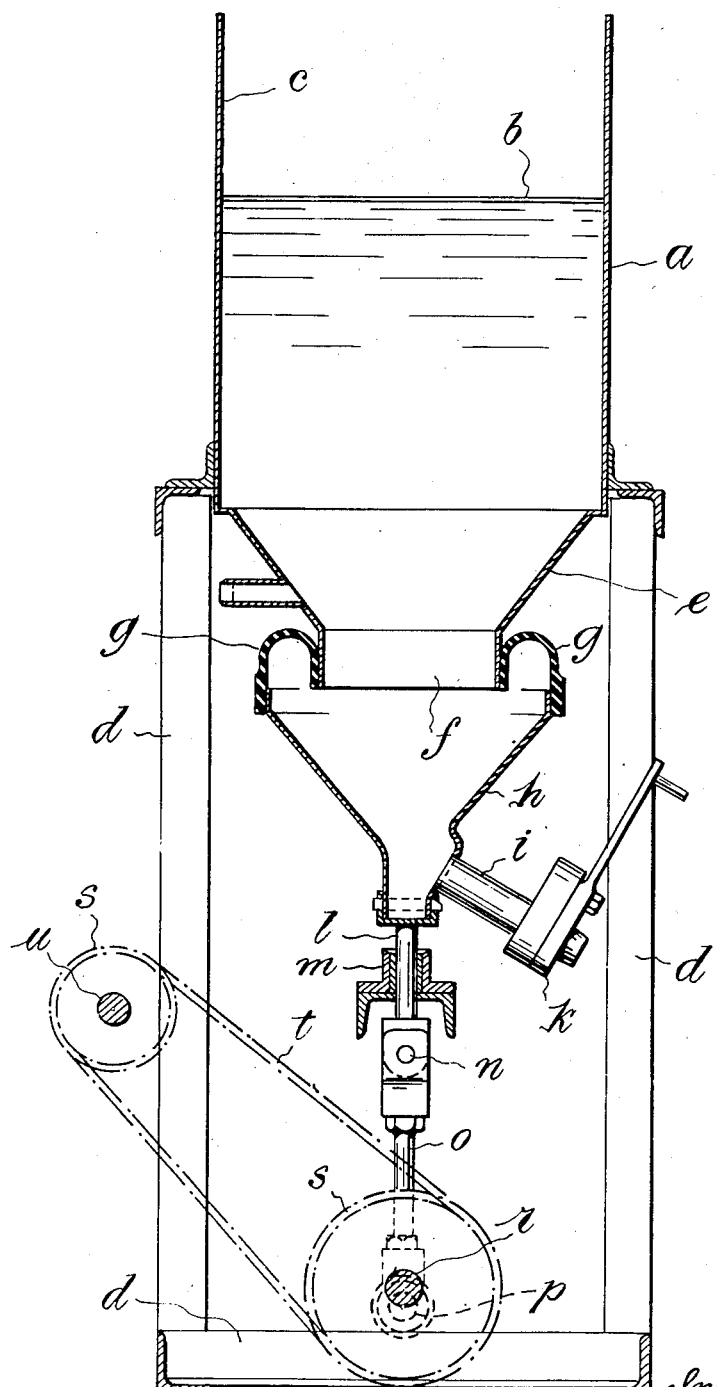

2,333,347

UNITED STATES PATENT OFFICE 2,333,347

SEPARATION OF SOLID MATERIALS OF DIFFERENT SPECIFIC GRAVITIES

Fredrick Trostler, London, England, assignor to The Sink and Float Corporation, New York, N. Y., a corporation of New York Application October 9, 1940, Serial No. 360,504 In Great Britain October 18, 1939

1 Claim. (Cl. 209—173)

This invention relates to the separation of solid materials of different specific gravities according to the sink-and-float principle.

This principle, as is well known, involves the feeding of the materials to be separated to a body of liquid medium or so-called heavy liquid of specific gravity intermediate between the specific gravities of the lighter and heavier components of the materials, so that the lighter portion floats and the heavier portion sinks.

In putting this principle into practice, various liquid media have been employed. In some cases, use is made of solutions, such as solutions of zinc chloride and calcium chloride, and these of course are quite stable. In other cases, suspensions of different substances in water have been used, such as suspensions of clay, barytes and galena, and these though not true solutions have been regarded as comparatively stable in use or can be maintained relatively stable by addition of suitable agents. A further well-known process provides for the use of a mechanical mixture of a solid with a liquid such as sand and water, the mixture being caused to assume the characteristics and properties of a liquid by agitation so that in no sense can it be regarded as a solution or suspension.

Mechanical mixtures have the advantage of relatively high mobility or fluidity and thus have low viscosity, but they are unstable and the agitation which they involve is apt to interfere with true sink-and-float separation. Solutions and suspensions on the other hand do not require agitation to obtain stability and present a far better proposition from the point of view of providing for comparatively true sink-and-float separation, and of these, suitable suspensions have the considerable advantages over solutions of much less expense in initial cost and upkeep and of no loss due to evaporation.

In sink-and-float processes, however, viscosity is an important factor in determining the efficiency of the separation obtainable and if it is high, it unduly retards the sinking of the heavier particles of the materials under treatment. It is recognized, of course, that there is a normal and permissible retardation in sink-and-float work, corresponding to an optimum condition, but if the degree of retardation is higher than this the separation becomes relatively inefficient and solutions and suspensions fall in this class.

This latter retardation, or viscous resistance as it may be termed and is so referred to herein, is considered to be a result both of the viscosity of the medium and the surface area of the heavier particles of the materials being separated as it increases with decreasing particle size. Thus the smaller the particles the greater is the viscous resistance. From this it follows that there is a certain minimum limit to the size of the heavier particles which can be separated in practical manner in any given medium, particularly if the medium is of high specific gravity, and in ore and coal concentration with suspensions or solutions it is recognized that for small particles below about 2.5 to 3 mm. in size, the viscous resistance is too great to allow free settling, that is settling by gravity alone, in a sufficiently rapid and/or accurate manner for commercial purposes. Even with minerals characterised by a very marked difference in specific gravity between the "sink" component and the "float" component it has not been possible to treat particles below about 2.5 to 3 mm. in size satisfactorily. The viscous resistance will also affect the separation of larger particles if the viscosity of the medium is too high and it has generally been considered that increase of the viscosity was detrimental to the efficiency of the separation—in so far as it introduced higher resistance to free settling of the "sink" component.

It will thus be understood that this viscous resistance exerts a markedly deleterious influence in sink-and-float separation processes using solutions or suspensions as the separating media, and the principal object of the present invention is to provide a new or improved process in which the medium used is a suspension, whereby this influence may be counteracted so that effective separation may be possible down to a desirably lower limit of size of the heavier particles even in separating media of relatively high viscosity.

In the specification of the prior Patent No. 2,191,805 granted to Andrew Pearson, a method of float-and-sink separation is described by which a slight upward current of substantially uniform strength is imposed throughout a body of heavy liquid comprising a suspension in a separating vessel in order to counteract deleterious crosscurrents and downward drag effects of the "sink" material but so as not to disturb sink-and-float conditions. In the present invention, on the contrary, provision is made for producing a slight directional effect in the opposite sense in the body of heavy liquid, as by causing slight vertical pulsations therein in such manner as to cause a net downward movement. This movement, suitably controlled, is found to produce highly advantageous results in overcoming viscous resistance and in causing relatively small particles of "sink" material to settle efficiently, in a "sink-and-float" process employing a relatively stable suspension medium.

According to this invention, therefore, a sink-and-float process of separating solid materials of different specific gravities comprises the employment as a separating medium of a relatively stable suspension having a specific gravity intermediate between the specific gravities of the lighter and heavier components of such materials, and the application throughout this medium of an influence which exerts a downward force or pull on the particles of the heavier or "sink" component of said materials, this influence being applied or controlled in such manner as to provide for these particles a falling energy which substantially is just sufficient in all parts of the medium to overcome the viscous resistance in sink-and-float operation.

Thus a body of suspension of the desired specific gravity in a separating vessel may have superimposed on it a pulsating effect which is sufficient to generate the downward force or pull but is applied or controlled so as to avoid disturbance of the sink-and-float conditions. Any considerable movement in the body of medium such as might be applied by jigging is to be avoided. Jigging in its accepted sense is intended to exert a definite lifting impulse on the lighter particles to separate them or to cause agitation sufficient to produce mechanical mixtures aforesaid, and thus involves pulsations of a comparatively high magnitude which would deleteriously affect the quiet conditions required for really efficient sink-and-float separation. Under appropriate conditions with the present process there is substantially no interference with the separation by floating of the lighter material. At the same time it will be realized that provision is made by the invention for a substantially unagitated separating medium of a specific gravity lying between the specific gravities of the "float" and "sink" components and the small particles of "sink" material are able to sink as effectively in the bath of liquid medium as larger particles.

In effect, the invention introduces into the sink-and-float process of separation by suspensions a new element, namely a carefully prescribed downward impulse or pull on the heavier particles, and this element is able to produce effective separation of materials comprising particles below 2.5 to 3 mm. in size, or effective separation in liquid media of high viscosity. It has, in fact, been found by experiment to be possible to treat successfully materials comprising particles of a size of minus 2.5 mm. plus 60 mesh and of even wider size range and much more viscous separating media than heretofore could be employed.

In carrying out the new or improved process the materials to be separated may be fed on to or near the upper surface of the body of separating medium. The downward impulse or pull may be generated by any suitable apparatus for example a reciprocating piston or diaphragm which may be applied to the lower end or any other suitable point of the separating vessel and with appropriately short stroke, as contrasted with the relatively long stroke used in jigging separation. This will cause only slight pulsation hardly visible on the surface of the liquid so that there is no agitation in the sense used in jigging but simply sufficient pulsation for the desired downward pull effect. It will be noted that the upward component of force due to the pulsations is less than sufficient to eliminate the falling velocity under gravity of the slowest-falling among the small particles of "sink" referred to, through the separating medium, as otherwise these small particles would not descend through the medium at rates permitting commercial operation of the apparatus, as has been observed to take place.

It may be noted that the desired effect of a slight net downward movement in the medium, promoting the fall of the small "sink" particles, is found to be caused by the operation of a reciprocating piston or diaphragm as above described, and having equal upward and downward beats. This appears to be true even when no material to be separated is fed into the separating vessel; the impact caused by the slight upward stroke has been found to be insufficient to produce through the body of a heavy and viscous medium the same effect as in jigging, perhaps because of the resistance of the medium to transmit a slight mechanical impulse to the effective area, while, on the other hand, the downward impulse appears to be by no means hampered by the use of the heavy medium. Further, the net result of a slight downward drag in the suspension medium is, naturally, more marked when materials to be separated are fed on to or near the top of the body of medium, because of the downward drag of the falling heavy particles, in the absence of any intentionally produced slight upward current, as in the Pearson patent above referred to. The downward impulse, in the case of suspensions, has been observed to have a slight continuous destabilizing action on the coarser particles of the medium solid but this is no disadvantage because the specific gravity of the medium can be maintained substantially constant throughout the body of the medium by continuously feeding fresh medium at or near the top, this being a procedure of normal nature to make up for medium passing away with the discharged separated materials, medium being continuously withdrawn from the bottom of the body of medium to maintain circulation through the body of medium. The slight destabilising action, in fact, presents an advantage in that the medium coarser particles have a combing effect on the materials under treatment and thus improve the separating action.

If desired, the downward beat of the piston or diaphragm may be quicker than the upward beat, which may readily be accomplished by the use of devices for regulating the relative upward and downward movements of the moving member. This will be useful in cases in which a stronger downward movement is required than is produced by equal beats. Further, variation of the frequency of pulsation is also possible, so long as the desired substantially unagitated condition of the medium is achieved, it being noted that higher or lower frequencies may be found to be more effective for operations upon different types of ore or other material. It is further noted that a further important advantage of the short stroke described is that the power consumption may be very low.

It is further to be remarked that, in accordance with this invention, the following conditions of operation must prevail, in order that the best results be obtained: Slight vertical pulsations are applied continuously to the body of the medium, or a slight downward pull is otherwise produced continuously during the separating operation. The pulsations or pull must be sufficiently strong to effect a slight downward pull on small "sink" particles at or near the surface of the medium, which may vary somewhat with the viscous resistance to be overcome, with one or another type of medium. The pulsations, on the other hand, must be so slight in the energy transmitted thereby, as not to interfere with the working of the normal sink-and-float process. Further, the pulsations should be applied in such a manner as not to cause disturbing cross currents or eddy currents; this may be accomplished by applying them constantly, in a vertical direction. In practice, the necessary energy to be applied can be determined, under varying conditions, by the results of separation obtained, and in general the energy of pulsation will be such that its effect is scarcely visible on the surface of the medium. It should further be noted that the rate of introduction of the fresh medium at the top and withdrawal of used medium at the bottom should be sufficient to prevent more than a slight destabilising, that is, more than a slight segregation within said body of medium, which must not be enough to interfere with normal sink and float separation. Amount of permissible segregation, that is, increasing density downwards in the separator, depends of course on the fineness of separation required. It may be said however that good results are obtained with an entirely normal rate of introduction of medium at the top and removal thereof with the "sink" at the bottom, this being sufficient to prevent excessive destabilizing and segregation, due both to the inherent tendency of the solids to settle out of suspension and to the effect of the downward pulsations. It is also noted that the downward pulsations give an added downward velocity to the "sink" particles which aids their downward passage through the slightly denser strata of medium in the lower part of the separator.

In comparison with the operation under the Pearson patent referred to above, the slight upward current therein produced was provided to overcome disturbing eddy currents and the like produced by the drag effect of the heavy particles falling through the medium. In the present case it appears that such down drag, working in conjunction and conformity with the vertical pulsations, does not have any detrimental effect on the accuracy of separation. The slight vertical pulsations also have no substantial effect upon the separation of the "float" material, which is separated by floating it on the medium in the usual manner. It is also found that the disturbing eddy currents referred to are eliminated with the downward vertical pulsations described as well as with the gentle upward currents of Pearson.

In order to enable the invention to be more readily understood, reference is directed to the accompanying drawing which illustrates in sectional elevation one suitable form of apparatus for use in separating solid materials of different specific gravities in accordance with this invention.

The apparatus shown comprises a separating vessel $a$ in which the level or upper surface of the liquid medium may be say at $b$. The upper part $c$ of this vessel above the level $b$ may be elongated in a direction at right-angles to the paper to provide a compartment for a rake conveyor for assisting in removing the lighter separated material at the top of the medium in $a$, and any of the conventional means may be provided for feeding materials to be separated to the upper part of the liquid medium and draining the separated lighter or "float" material, removed at this place, from medium passing off with it. The vessel $a$ is supported on a framework $d$ and at the bottom is tapered at $e$ to a cylindrical part $f$ around which is fitted a diaphragm $g$ shown having the form of an annular rubber body of inverted U section. At its outer periphery, the diaphragm is fitted to the upper end of a conical hutch $h$ which has an outlet connection $i$ controlled by a swing gate or slide $k$ for discharge of the heavier or "sink" material from the hutch, and medium therewith at a sufficient rate to maintain the level in the separator. For vibrating the diaphragm, the hutch is connected at the bottom to a short connecting rod $l$ reciprocatory in a fixed bearing $m$ and coupled at its lower end by pivot $n$ to a crank rod $o$ embracing at its lower end a crank pin $p$ carried by a disc mounted on a shaft $r$. Drive is imparted to the shaft $r$ by sprockets $s$ and sprocket chain $t$ from a motor driven shaft $u$.

In operation, the materials to be separated and make-up medium are fed at or near the top of the vessel $a$ and movement is imparted to the diaphragm $g$ by the crank-pin $p$ which has an appropriately short throw so that the diaphragm $g$ in reciprocating produces the downward force or pull on the particles of the heavier or "sink" component of the said materials as above described. The lighter or "float" component of such materials is removed or overflows at the level $b$ of the medium and the "sink" component, which passes through the middle of the diaphragm $g$ by the cylindrical part $f$ of the vessel $a$ into the hutch $h$, is discharged continuously through the outlet $i$.

The invention is of advantageous application to the concentration of ores but it is also applicable to the treatment of other materials such as the cleaning of coal. According to one example of operation on lead-zinc ores containing about 12% Zn and 1.5% Pb and comprising gangue of 2.6 to 2.8 specific gravity, an aqueous galena separating medium was used having a specific gravity of 2.9 with pulsation applied by a vibrating piston or diaphragm having 1/4" stroke. In the example given the diaphragm was making 205 pulsations per minute, and was connected as shown in the drawing so that its pressure and suction were evenly applied over the entire bottom of the body of separating medium. The height of the body of medium in the separating vessel was roughly one foot and the surface area of the vessel was roughly one square foot. The ore was fed unsized minus 1/8" plus 60 mesh, and the ratio of concentration was 1:3, showing approximately 64% rejects with less than 0.5% of sulphides (PbS and ZnS). The rate of continuous medium admission and withdrawal was approximately 1 gal./min., and the density differential from top to bottom of the separator was approximately 0.04 (2.72–2.76). No middlings products were produced; this, as will be realised, shows a high degree of efficiency of operation made possible by the new or improved process.

Another example of the results achieved by the present invention is to be seen from the following metallurgical results from a test carried out on unsized lead ore, which after treatment was divided into three fractions of concentrates and tailings for the examination:

| Product | Mesh | Weight in pounds | Percent weight | Assay percent Pb | Percent Pb distribution |
|---|---|---|---|---|---|
| Concentrates | +18 | 18.75 | 43.86 | 14.95 | 98.48 |
| Tailings | +18 | 24.00 | 56.14 | 0.18 | 1.52 |
| Concentrates | −18+44 | 12.8125 | 27.08 | 32.98 | 98.47 |
| Tailings | −18+44 | 34.5000 | 72.92 | 0.19 | 1.53 |
| Concentrates | −44+80 | 2.875 | 18.11 | 40.44 | 92.44 |
| Tailings | −44+80 | 13.000 | 81.89 | 0.73 | 7.56 |

These results may be summarized as follows:

| Product | Weight in pounds | Percent weight | Percent Pb | Percent Pb distribution |
|---|---|---|---|---|
| Combined concentrates | 34.4375 | 32.5 | 23.780 | 97.57 |
| Combined tailings | 71.5000 | 67.5 | 0.285 | 2.43 |
| Head sample | 105.9375 | 100.0 | 7.92 | 100.00 |

As shown in the above tables no middlings were produced and a very sharp two-product separation has been effected.

I claim:

The process of separating substances of different specific gravities by the sink-and-float method, which comprises continuously introducing material to be separated into the upper portion of an unobstructed vertical column of separating medium, said medium being in the form of a suspension of comminuted insoluble particles capable of remaining substantially stable without agitation, and having a specific gravity between the specific gravities of the "sink" and "float" components of said material, continuously producing vertical pulsations substantially free of cross or eddy currents throughout the cross sectional area of the column by applying directly to said column alternate pressure and suction impulses of a character insufficient to substantially agitate the surface of the medium but to produce a resultant downward pull on "sink" particles in the medium, just sufficient to accelerate the descent of particles of less than 3 mm. in diameter near the top of the column by overcoming their viscous resistance, removing the "float" particles from the top and the "sink" particles from the bottom of the column, and maintaining stability of the medium to prevent segregation of particles therein by introducing medium into the top of the column and removing medium from the bottom of the column at a controlled rate sufficient to maintain circulation therethrough.

FREDRICK TROSTLER.